(12) United States Patent
Bartholomew

(10) Patent No.: US 8,752,326 B2
(45) Date of Patent: Jun. 17, 2014

(54) DECOY REFLECTION AND SHADOW

(76) Inventor: Todd Keola Bartholomew, Syracuse, UT (US)

( * ) Notice: Subject to any disclaimer, the term of this patent is extended or adjusted under 35 U.S.C. 154(b) by 398 days.

(21) Appl. No.: 13/134,263

(22) Filed: Jun. 3, 2011

(65) Prior Publication Data

US 2012/0304521 A1   Dec. 6, 2012

(51) Int. Cl.
*A01M 31/06* (2006.01)

(52) U.S. Cl.
USPC ............................................. 43/3; 43/2

(58) Field of Classification Search
USPC .......................................................... 43/2, 3
See application file for complete search history.

(56) References Cited

U.S. PATENT DOCUMENTS

| | | | | |
|---|---|---|---|---|
| 1,185,164 A * | 5/1916 | Batcher | | 43/3 |
| 3,021,635 A * | 2/1962 | Sheridan | | 43/3 |
| 4,607,447 A * | 8/1986 | Wright | | 43/3 |
| 4,845,872 A * | 7/1989 | Anderson | | 43/3 |
| D308,715 S * | 6/1990 | Swenson | | D22/125 |
| 5,002,525 A * | 3/1991 | Greenstreet | | 493/374 |
| 5,003,722 A * | 4/1991 | Berkley et al. | | 43/3 |
| 5,293,709 A * | 3/1994 | Cripe | | 43/3 |
| 5,477,875 A * | 12/1995 | Daly, Jr. | | 43/2 |
| 5,906,067 A * | 5/1999 | Layson | | 43/2 |
| 6,082,036 A * | 7/2000 | Cripe | | 43/3 |
| 6,640,483 B2 * | 11/2003 | Nelson | | 43/3 |
| 7,409,793 B1 * | 8/2008 | Schwarz | | 43/3 |
| 7,614,176 B2 * | 11/2009 | Wabnitz | | 43/3 |
| 2006/0218842 A1 * | 10/2006 | Wabnitz | | 43/3 |
| 2008/0163538 A1 * | 7/2008 | Butz | | 43/3 |

* cited by examiner

*Primary Examiner* — Kimberly Berona
*Assistant Examiner* — Marc Burgess
(74) *Attorney, Agent, or Firm* — Goucher Patent Law; Tyler Goucher

(57) ABSTRACT

An artificial reflection or dark shadow to be used in avian or animal attracting activities is disclosed. The artificial reflection or shadow may be used by itself or attached as to a floating waterfowl decoy which simulates the colored reflection off of the water or the dark shadow as a live bird would have. The decoy reflection and shadow can be used either floating on the water surface or by itself. The Reflection and Shadow can be of varying lengths and widths to simulate the shadow and/or reflection at differing times of the day and at different sun positions. The Reflection and Shadow could be of the entire aerial view of the bird or just a side view.

5 Claims, 1 Drawing Sheet

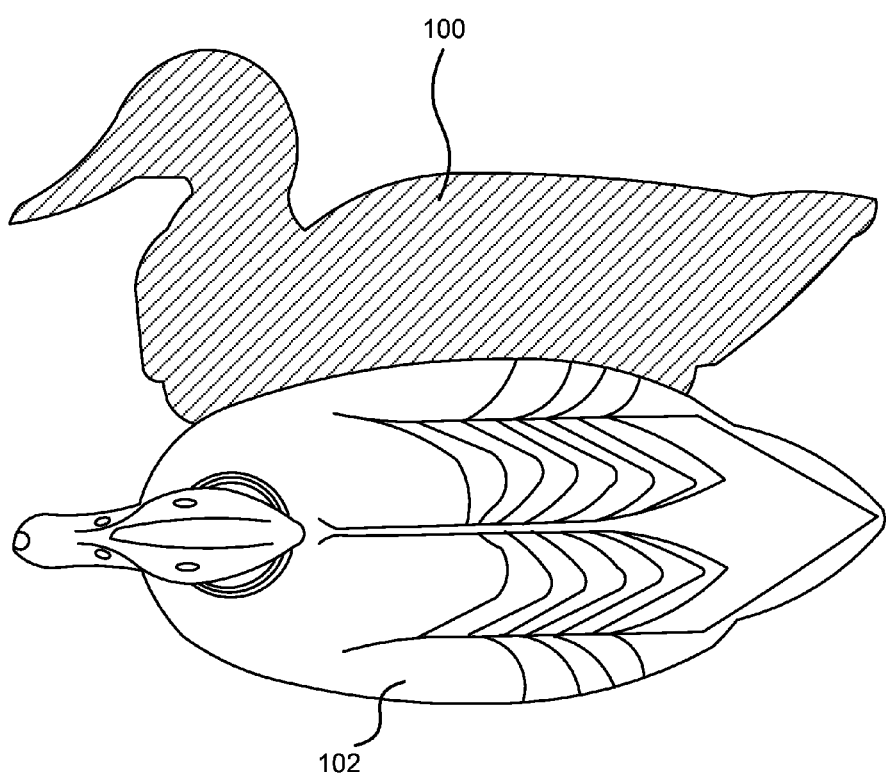

DECOY REFLECTION AND SHADOW

BRIEF SUMMARY OF THE INVENTION

1. The Decoy Reflection and Shadow is an artificial reflection or dark shadow used in bird or animal attracting activities. The artificial reflection or shadow may be used by itself or attached to a floating decoy as in waterfowl hunting to simulate the colored reflection off of the water or the dark shadow of a decoy as a live bird would have while sitting on the water's surface. The decoy reflection and shadow can be used either floating on a water surface or placed on the ground as in field hunting. The Reflection-Shadow can be of varying lengths, depths and widths to simulate the shadow and/or reflection of a decoy or live bird at differing times of the day and at different sun positions. On one side of the Reflection and Shadow could be printed the colored reflection and on the other the side the dark shadow allowing for variations and changes. The Reflection and Shadow could be of the entire aerial view of the bird or just a side view.

2. The Decoy Reflection and Shadow can also stabilize floating decoys and allow birds in the air and other animals to see the decoy from greater distances and from greater angles. The device can be attached to the under side of a floating decoy or to its keel giving the decoy greater stability against waves and winds.

3. The reflection can be printed or colored the same as a specific species of waterfowl or decoy, thus giving the appearance of a reflection or colored dark to simulate a natural shadow.

4. The Decoy Reflection and Shadow, when used on water can be made of any buoyant material. When the Decoy Reflection and Shadow is used on land, it could be made out of any ridged flat or semi flat material.

BRIEF SUMMARY OF THE INVENTION

1. The general idea of the Decoy Reflection and Shadow is to allow birds that are flying and that are prone to being decoyed, to see an artificial reflection off of the water or an artificial dark shadow from further away and from greater angles, thus getting the bird's attention and helping to decoy them closer.

2. The Decoy Reflection and Shadow can be attached to a any decoy, or used by itself. The Reflection and Shadow is buoyant and can be a full aerial view of a bird when looking straight down on it or from above, a silhouette of a decoy, giving the decoy a larger foot print.

3. There are other benefits of the Decoy Reflection and Shadow; when attached to a floating decoy, the reflection shadow gives stability to the decoy from waves and winds that may over turn the decoy or make the decoy "bob" unnaturally on the surface of the water. When made out of buoyant rubber—like Neoprene, as an example, the Reflection, Shadow becomes light weight, durable, keeps its form, and bends naturally with the waves as a duck would.

DETAILED DESCRIPTION OF THE INVENTION

1. As depicted in FIG. 1, the Decoy Reflection and Shadow 100 is an artificial floating reflection or dark shadow used to aid in the attraction of birds, such as waterfowl. The artificial reflection or shadow 100 may be used by itself or attached to a floating waterfowl decoy 102 to simulate and enhance the decoys 100 reflection or shadow off of the water or on land. The decoy Reflection and Shadow 100 can be used either floating on a water surface by itself or placed on the ground as in field hunting. The Reflection and Shadow 100 can be of varying lengths and widths to simulate the shadow and/or reflection of a decoy 102 or live bird at differing times of the day and at different sun positions. The Decoy Reflection and Shadow 100 can be made over sized so that high flying birds can more readily be attracted to the decoy 102. On one side of the Reflection and Shadow 100 could be printed the colored Reflection of the decoy 102, or bird it is resembling, and on the other the side, the dark shadow allowing for variations and changes. The Reflection and Shadow 100 could be of the entire aerial view of the bird or decoy 102 when looking straight down on it or just a side silhouette view.

2. The Decoy Reflection and Shadow 100 can also stabilize floating decoys 102 and allow birds in the air to see the decoy 100 from greater distances and from greater angles. The Device 100 can be attached to the side of a floating decoy 102 or its keel giving the decoy 102 greater stability against waves and winds.

3. The reflection side of the Decoy Reflection and Shadow 100 can be printed or colored the same as a specific species of bird or decoy 102, thus giving the appearance of a reflection or the other side of the Decoy Reflection and Shadow 100 may be colored dark to simulate a natural shadow.

4. The Decoy Reflection and Shadow 100, when used on water can be made of any buoyant material. As an example, rubber or Neoprene, can be printed on one side to simulate the reflection and on the other side to simulate a bird's shadow. When the Decoy Reflection and Shadow 100 is used on land, it can be made out of any ridged flat or semi flat material. There are other benefits of the Decoy Reflection and Shadow 100; when attached to a floating decoy 102, the reflection shadow 100 gives stability to the decoy 102 from waves and winds that may over turn the decoy 102 or make the decoy 102 "bob" or move unnaturally on the water surface. When made out of buoyant rubber—like Neoprene, the Reflection and Shadow 100 becomes light weight, durable, keeps its form, and bends with the waves as a duck would appear naturally floating on the water.

5. When looking straight down, an aerial view, on a decoy 102 or live bird, one does not see a 3D image. What is most prominent is the flat looking body of the bird, the reflection on the water or the dark shadow of the bird or decoy. The Decoy Reflection and Shadow 100 simulates and enhances this aerial view. The Reflection and Shadow 100 can be made long, as a real shadow would look in the early morning or late evening or be made to represent any shadow or reflection at any given point of the suns position.

The invention claimed is:

1. An apparatus to simulate a shadow of an animal, the apparatus comprising:
   a decoy comprising a simulated bird;
   a substantially flat sheet of material having a first side disposed opposite a second side, the substantially flat sheet of material having a profile shaped in a silhouette of an animal's shadow at a first time of a day; and
   an attachment to removably couple the substantially flat sheet of material to the decoy;
   wherein one of the first side and the second side of the substantially flat sheet of material includes an image, the image comprising one of a substantially dark solid image and an image colored to mimic the animal; and
   wherein the other of the first side and the second side of the substantially flat sheet of material comprises the other of the substantially dark solid image and the image colored to mimic the animal.

2. The apparatus of claim 1, wherein the attachment is disposed on one of a side of the decoy and a keel of the decoy to removably couple the substantially flat sheet of material to the decoy at one of the side of the decoy and the keel of the decoy.

3. The apparatus of claim 1, wherein the substantially flat sheet of material comprises a buoyant material.

4. The apparatus of claim 3, wherein the buoyant material of the substantially flat sheet of material facilitates maintaining the decoy in an upright position on water.

5. The apparatus of claim 1, further comprising a second substantially flat sheet of material, the second substantially flat sheet of material having a profile shaped in a silhouette of an animal's shadow at a second time of a day, the second time of day comprising a different time of day than the first time of day.

* * * * *